United States Patent
Ding et al.

(10) Patent No.: US 11,829,780 B2
(45) Date of Patent: Nov. 28, 2023

(54) OPEN-SOURCE CONTAINER CLUSTER HOT PLUG ADAPTER

(71) Applicant: International Business Machines Corporation, Armonk, NY (US)

(72) Inventors: Ning Ding, Shanghai (CN); Yongjie Gong, Shanghai (CN); Yao Zhou, Shanghai (CN); Ke Zhao Li, Shanghai (CN); Dan Dan Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 17/481,970

(22) Filed: Sep. 22, 2021

(65) Prior Publication Data

US 2023/0086565 A1     Mar. 23, 2023

(51) Int. Cl.
*G06F 9/445* (2018.01)
*G06F 8/71* (2018.01)
*G06F 9/4401* (2018.01)
*G06F 9/455* (2018.01)
*G06F 9/54* (2006.01)

(52) U.S. Cl.
CPC .......... *G06F 9/44505* (2013.01); *G06F 8/71* (2013.01); *G06F 9/4411* (2013.01); *G06F 9/45558* (2013.01); *G06F 9/54* (2013.01); *G06F 2009/4557* (2013.01); *G06F 2009/45579* (2013.01)

(58) Field of Classification Search
CPC ...... G06F 9/44505; G06F 8/71; G06F 9/4411; G06F 9/45558; G06F 9/54; G06F 2009/4557; G06F 2009/45579
See application file for complete search history.

(56) References Cited

U.S. PATENT DOCUMENTS

| | | | |
|---|---|---|---|
| 10,728,145 B2 * | 7/2020 | Rao | H04L 41/0893 |
| 11,620,166 B2 * | 4/2023 | Moyer | G06F 9/5083 |
| | | | 718/102 |
| 2020/0076685 A1 * | 3/2020 | Vaidya | G06F 8/60 |
| 2020/0153898 A1 * | 5/2020 | Sabath | G06F 9/4856 |
| 2020/0310789 A1 * | 10/2020 | Zhou | G06F 16/27 |
| 2021/0124624 A1 * | 4/2021 | Jeong | G06F 9/5044 |
| 2021/0136147 A1 * | 5/2021 | Giassa | H04L 12/2814 |

FOREIGN PATENT DOCUMENTS

| | | |
|---|---|---|
| CN | 112230847 A | 1/2021 |
| CN | 112506444 A | 3/2021 |
| CN | 111273871 B | 5/2021 |
| CN | 112764766 A | 5/2021 |

OTHER PUBLICATIONS

Helmbrecht et al., "Using the IBM Block Storage CSI Driver in a Red Hat OpenShift Environment", RedBooks, May 2021, 152 pages, <https://www.redbooks.ibm.com/redpapers/pdfs/redp5613.pdf>.

(Continued)

*Primary Examiner* — Phillip H Nguyen
(74) *Attorney, Agent, or Firm* — Heather Johnston (57) ABSTRACT

A system may include a cluster and a module of the cluster. The module may include a user resource definition and a catalog server. The catalog server may maintain a configuration of the cluster.

20 Claims, 10 Drawing Sheets

(56) References Cited

OTHER PUBLICATIONS

International Searching Authority, "The International Search Report and The Written Opinion of The International Searching Authority", International application No. PCT/EP2022/074851, International filing date Sep. 7, 2022, Applicant's or agent's file reference, dated Nov. 22, 2022, 8 pages.
Anonymous. "Device Plugins." Printed Jul. 16, 2021. 4 pages. Published by Kubernetes. https://kubernetes.io/docs/concepts/extend-kubernetes/compute-storage-net/device-plugins/.
Mell, et al., "The NIST Definition of Cloud Computing," Recommendations of the National Institute of Standards and Technology, U.S. Department of Commerce, Special Publication 800-145, Sep. 2011, 7 pgs.

\* cited by examiner

OPEN-SOURCE CONTAINER CLUSTER HOT PLUG ADAPTER

BACKGROUND

The present disclosure relates to cloud platform storage and more specifically to open-source containers.

Cloud computing increasingly implements container systems for deployment. Open-source container environments offer adaptive load balancing, service registration, deployment, operation, resource scheduling, and capacity scaling. In an open-source container environment, external devices may be connected to clusters via sidecars.

SUMMARY

Embodiments of the present disclosure include a system, method, and computer program product for connecting a device to an open-source container cluster.

A system may include an open-source container cluster and a module of the open-source container cluster. The module may include a customer resource definition and a catalog server. The catalog server may maintain a configuration of the open-source container cluster.

In some embodiments, the system may further include a protocol using a register process and a device external to the cluster in communication with the cluster via the protocol. In some embodiments of the present disclosure, the system may further include a device external to the cluster in communication with the cluster via the protocol.

In some embodiments, the cluster may be a Kubernetes® cluster.

In some embodiments, the system may further include a configuration of an external driver, wherein the catalog server maintains compatible versions between the cluster and the external driver.

In some embodiments, the system may further include a repository in communication with the catalog server. The repository may maintain version information of a component of an external device. In some embodiments of the present disclosure, the repository may manage the component of the external device.

In some embodiments, the catalog server may update the configuration and a driver to maintain interoperability between the configuration and the driver.

A method in accordance with the present disclosure may include introducing, by a user, an extension module to a cluster and manifesting the configuration in the cluster. The extension module may include a user resource definition and a catalog server. The catalog server may maintain a configuration of the cluster.

In some embodiments of the present disclosure, a method may further include utilizing a register function and connecting a device external to the cluster in communication with the cluster via a protocol. The register function may be from the protocol.

In some embodiments of the present disclosure, the cluster may be a Kubernetes® cluster.

In some embodiments of the present disclosure, a method may further include introducing an external driver. The catalog server may maintain compatible versions between the cluster and the external driver based on a configuration of the external driver.

In some embodiments of the present disclosure, a method may further include communicating the catalog server with a repository. Some embodiments may also include managing a driver with the repository.

In some embodiments of the present disclosure, a method may further include updating the configuration and a driver to maintain interoperability between the configuration and the driver.

A computer program product in accordance with the present disclosure may include a computer readable storage medium with program instructions embodied therewith. The program instructions may be executable by a processor to cause the processor to perform a function. The function may include introducing, by a user, an extension module to a cluster manifesting a configuration in the cluster. The extension module may include a user resource definition and a catalog server. The catalog server may maintain the configuration of the cluster.

In some embodiments of the present disclosure, the computer program product may include utilizing a register function, wherein the register function is from a protocol and connecting a device external to the cluster in communication with the cluster via the protocol.

In some embodiments of the present disclosure, the computer program product may include the cluster is a Kubernetes cluster.

In some embodiments of the present disclosure, the computer program product may include introducing an external driver, wherein the catalog server maintains compatible versions between the cluster and the external driver based on a configuration of the external driver.

In some embodiments of the present disclosure, the computer program product may include communicating the catalog server with a repository.

In some embodiments of the present disclosure, the computer program product may include updating the configuration and a driver to maintain interoperability between the configuration and the driver.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cloud platform storage and more specifically to open-source containers.

In an open-source container environment, external devices may be attached to an open-source container cluster via sidecars. For example, an external storage may use a container storage interface (CSI) sidecar to connect to a cluster. Sidecars may be manually installed to an operator or helm by a cluster administrator. The administrator manually reviews relevant documents and/or user guides to match the version of the operator (or helm) to the external device as upgrading the operator (or helm) package version does not check the compatibility with external devices. Thus, administrators are responsible for manually installing operators for each piece of hardware and maintaining version compatibility between the operator (or helm) and the hardware.

To properly communicate with an open-source container cluster, an external device must be compatible with the application programming interface (API) the cluster. The manifest, driver, and extension module of the cluster are components that communicate with each other in the cluster and thus must use compatible APIs. For compatibility purposes, an external device must realize the interface of these components of the cluster and use a compatible API to communicate with the cluster.

A hot plug adapter in accordance with the present disclosure may also enable connecting an external device to an open-source container cluster. A hot plug adapter for connecting external devices to a cluster in accordance with the present disclosure may include an extension module with a catalog server, an interface, and a protocol.

The extension module in the cluster may provide an ability to generate and monitor a customer resource definition (CRD), which may also be referred to as a user resource definition, of a common type for external devices. The catalog server may use a common interface to communicate with one or more external devices; the catalog server lists, watches, and updates a manifest and configurations to facilitate communication between the external device and the cluster.

The interface and protocol may be between the extension module in the cluster and the external device. The protocol may use the register method to connect the device with the cluster. On the device side, the protocol may be implemented in a manifest pod with the requirement information and requisite configurations.

In some embodiments of the present disclosure, the hot plug adapter may enable a one-click installation of external devices to a cluster. External devices connected to an open-source container cluster via a hot plug in accordance with the present disclosure may be accessed by any unit of the cluster, such as one or more pods within the cluster.

According to the present disclosure, the versions of hardware and software in the cluster may be consistently maintained. In particular, the various versions of hardware and software in the cluster and a connected device may be maintained to facilitate proper communication between the cluster and the connected device.

Facilitation of communication between an open-source container cluster and an external device connected thereto may be enabled, in whole or in part, by maintaining compatibility between the cluster and the connected external device. In accordance with some embodiments of the present disclosure, the compatibility of external devices may be maintained at one location (e.g., the firmware, the microcode, or the operator) rather than requiring multiple locations (e.g., both the firmware and the operator, or the firmware, the operator, and the microcode) to maintain compatibility. In some embodiments, vendors may manufacture external devices for connection to clusters that further enable ease of maintenance by, for example, enabling ease of access to the specific location of the device which may be used to maintain compatibility with a connected cluster.

Compatibility between an open-source container cluster and a connected external device may be maintained across upgrades. In some embodiments of the present disclosure, an administrator may upgrade any external devices while maintaining compatibility with the connected cluster. In some embodiments, all external devices may be upgraded with a single command, such as a single keystroke or a single click. In some embodiments of the present disclosure, an administrator may upgrade both the external devices and the cluster simultaneously; in some embodiments, an upgrade may be implemented with a single command. A system in accordance with the present disclosure may include an open-source container cluster and a module of the cluster. The module may include a customer resource definition and a catalog server. The catalog server may maintain a configuration of the cluster.

In some embodiments, the system may further include a protocol using a register process and a device external to the cluster in communication with the cluster via the protocol. In some embodiments of the present disclosure, the system may further include a device external to the cluster in communication with the cluster via the protocol.

In some embodiments, the cluster may be a Kubernetes® cluster.

In some embodiments, the system may further include a configuration of an external driver, wherein the catalog server maintains compatible versions between the cluster and the external driver.

In some embodiments, the system may further include a repository in communication with the catalog server. The repository may maintain version information of a component of an external device. In some embodiments of the present disclosure, the repository may manage the component of the external device.

In some embodiments, the catalog server may update the configuration and a driver to maintain interoperability between the configuration and the driver.

Figure 1:
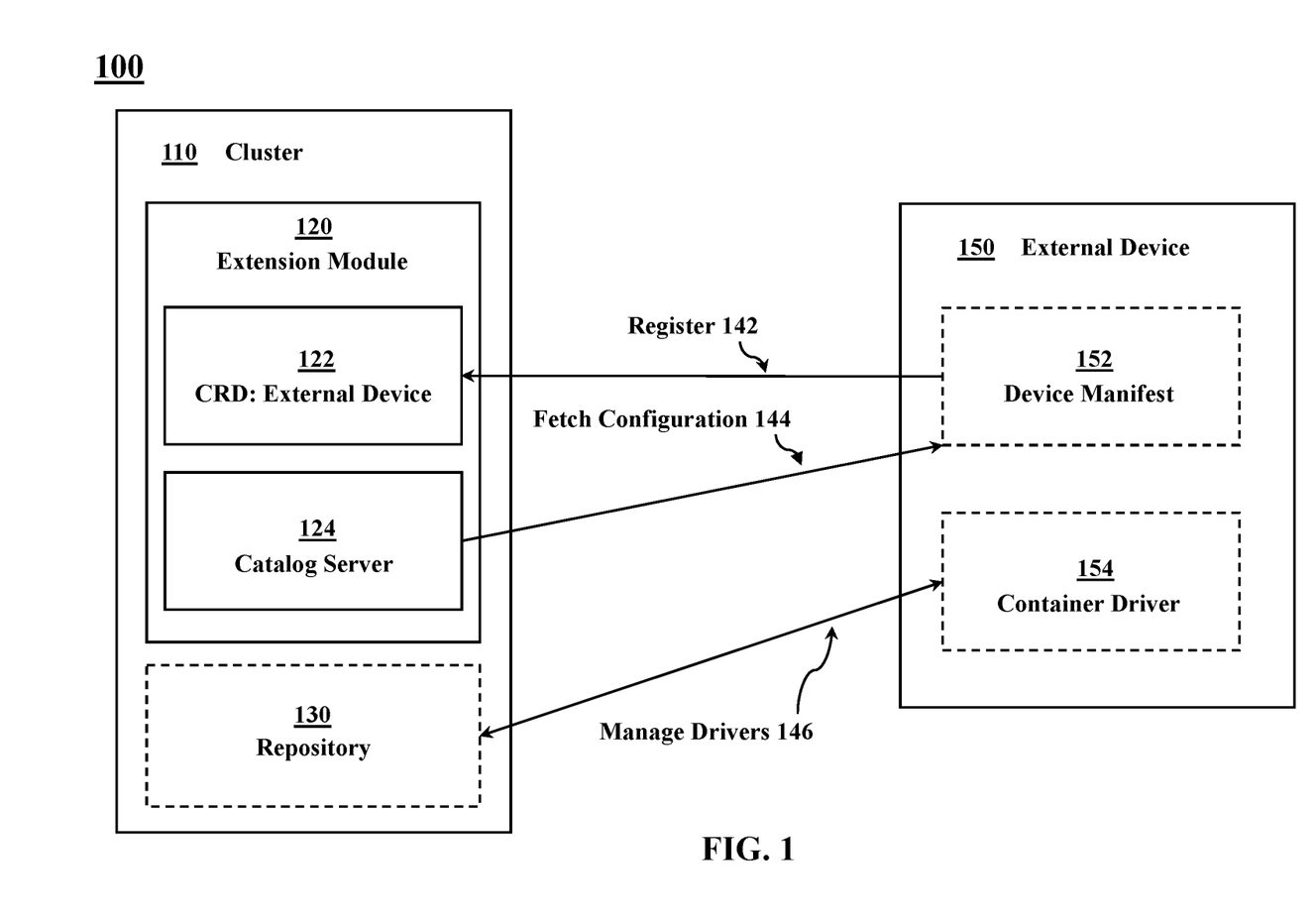
FIG. 1 illustrates an open-source container cluster system in accordance with some embodiments of the present disclosure.

FIG. 1 illustrates a cluster system 100 in accordance with some embodiments of the present disclosure. The cluster system 100 includes a cluster 110 and an external device 150 connected thereto. The cluster 110 performs operations with the external device 150 to ensure compatibility between the cluster 110 and the external device 150.

The external device 150 may include a device manifest 152 and a container driver 154. The device manifest 152 may communicate with an extension module 120 in the cluster 110 to register 142 the external device 150 with the cluster 110. The extension module 120 may form a CRD 122 for the external device 150. The extension module 120 may include a catalog server 124, and the catalog server 124 may fetch the configuration 144 of the external device 150 from the device manifest 152 upon registration of the external device 150 with the cluster 110.

In some embodiments, the cluster 110 may include a repository 130 and the external device 150 may contain a container driver 154. The repository 130 may be, for example, an operator repository (e.g., an OperatorHub), a controller repository, or a driver repository. The repository 130 may manage drivers 146 of the cluster system 100 by communicating with the container driver 154. The repository 130 may work with the container driver 154 to manage drivers 146 on both the cluster 110 side of the cluster system 100 as well as on the external device 150 side of the cluster system 100.

The external device 150 may include a common interface with a representational state transfer (REST) uniform resource locator (URL), a RESTful URL, a remote procedure call (RPC) address (e.g., a gRPC address), and/or similar. The external device 150 may house manifest data (e.g., data about and configuration of the external device 150) in the device manifest 152; manifest data may include, for example, an open-source container version support list, an operator compatibility list, an operator deployment configuration, and similar information. The external device 150 may include a driver (e.g., a containerized driver) in the container driver 154; the driver may manage, update, and maintain the firmware and microcode of the external device 150.

The cluster system 100 may be any container cluster system such as a Kubernetes® cluster system (which may also be referred to as a k8s® cluster system), an OpenShift® cluster system, or the like. The cluster 110 may be a Kubernetes® cluster, an OpenShift® cluster, or other container cluster.

Figure 2:
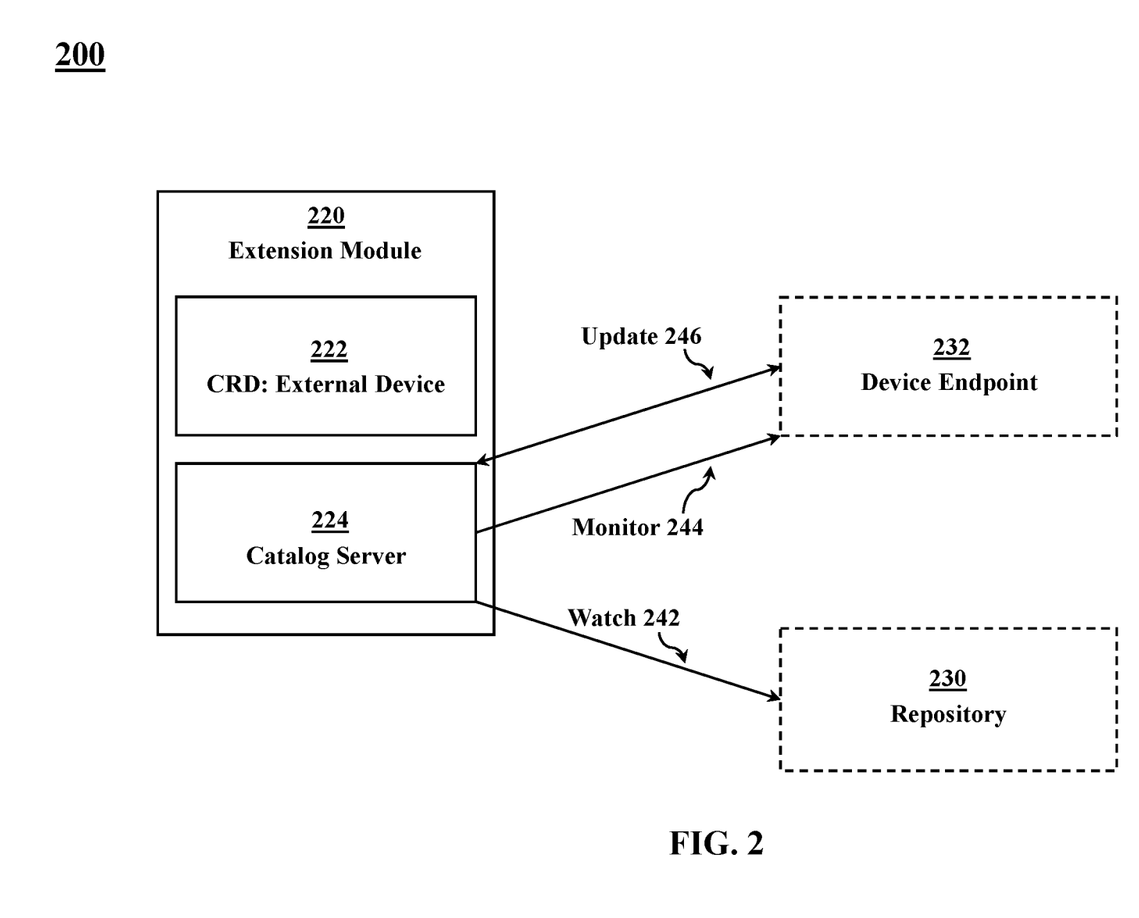
FIG. 2 depicts an extension module system in accordance with some embodiments of the present disclosure.

FIG. 2 depicts an extension module system 200 in accordance with some embodiments of the present disclosure. The extension module system 200 includes an extension module 220, a driver endpoint 232, and a repository 130. The extension module 220 includes a CRD 222 for an external device and a catalog server 224.

The CRD 222 includes basic information about an external device (such as the external device 150 shown in FIG. 1). The device information the CRD 222 may include may be, for example, the type of device (e.g., storage, network, et cetera), the vendor information (e.g., the manufacturer name), the version of the device and employed software, and the like. The CRD 222 may include a REST URL and/or an RPC address such as a gRPC address.

The catalog server 224 communicates with the repository 230 and the device endpoint 232. The catalog server 224 watches 242 the repository 230 to monitor for changes such as updates. The catalog server 224 communicates with the device endpoint 232. The catalog server 224 monitors 244 and updates 246 the device endpoint 232 as desirable and/or necessary to maintain version consistency.

Figure 3:
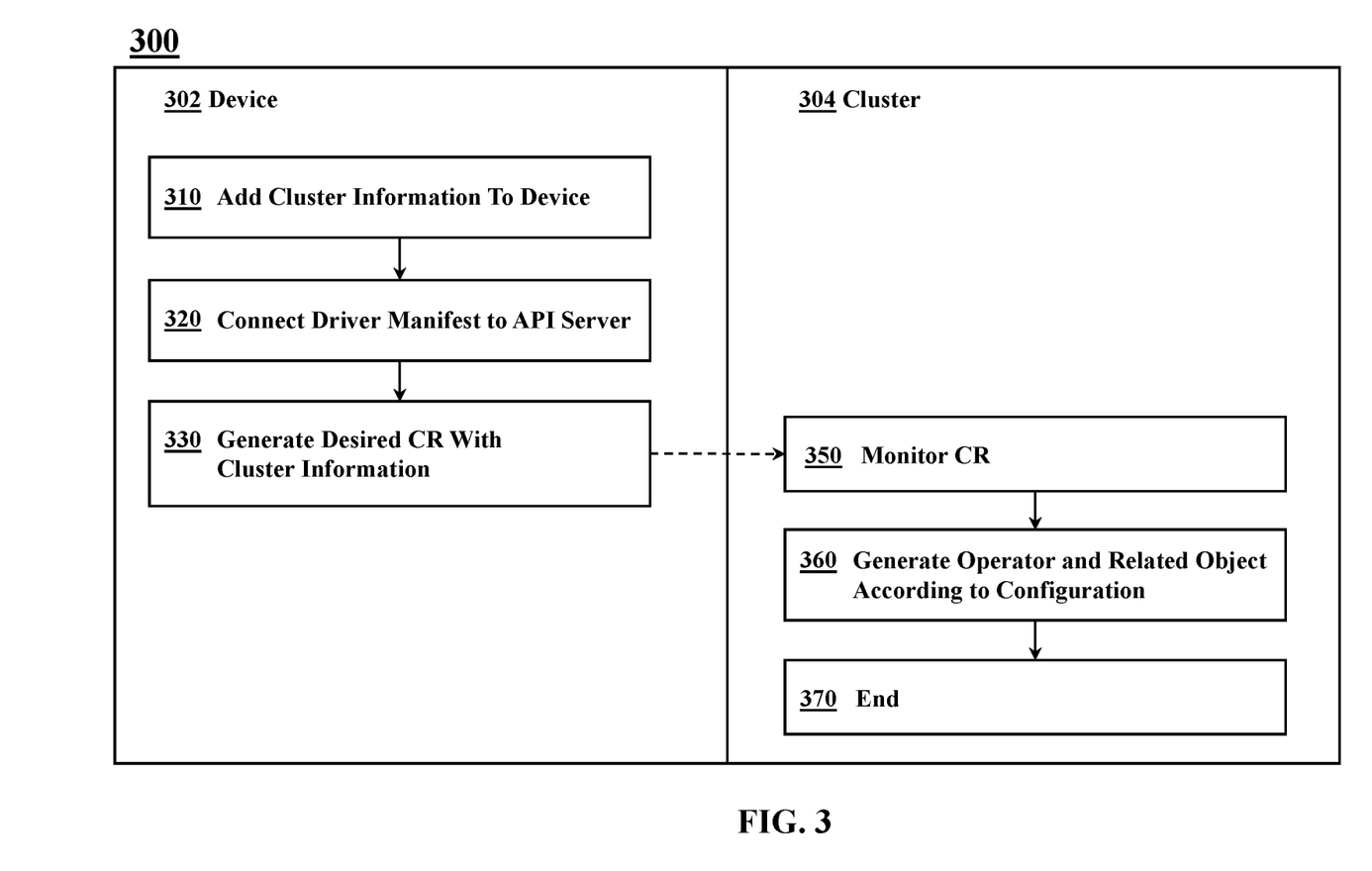
FIG. 3 illustrates an installation workflow in accordance with some embodiments of the present disclosure.

FIG. 3 illustrates an installation workflow 300 in accordance with some embodiments of the present disclosure. The installation workflow 300 occurs on a device 302 and in an open-source container cluster 304. The installation workflow 300 may commence on the device 302 by adding 310 the cluster 304 information to the device 302. Adding 310 the cluster 304 information to the device 302 may occur via, for example, command line input or a graphical user interface (GUI) of the device 302. The installation workflow 300 may continue by connecting 320 the driver manifest to API server; this may be completed using the cluster 304 information from the adding 310 operation. The installation workflow 300 may continue by generating 330 a desired customer resource (CR) with the cluster information.

The installation workflow 300 may continue with the cluster 304 monitoring 350 the CR. The installation workflow 300 may include generating 360 an operator and a related object within the cluster 304 according to the configuration provided in the CR and then ending 370 the process.

Figure 4:
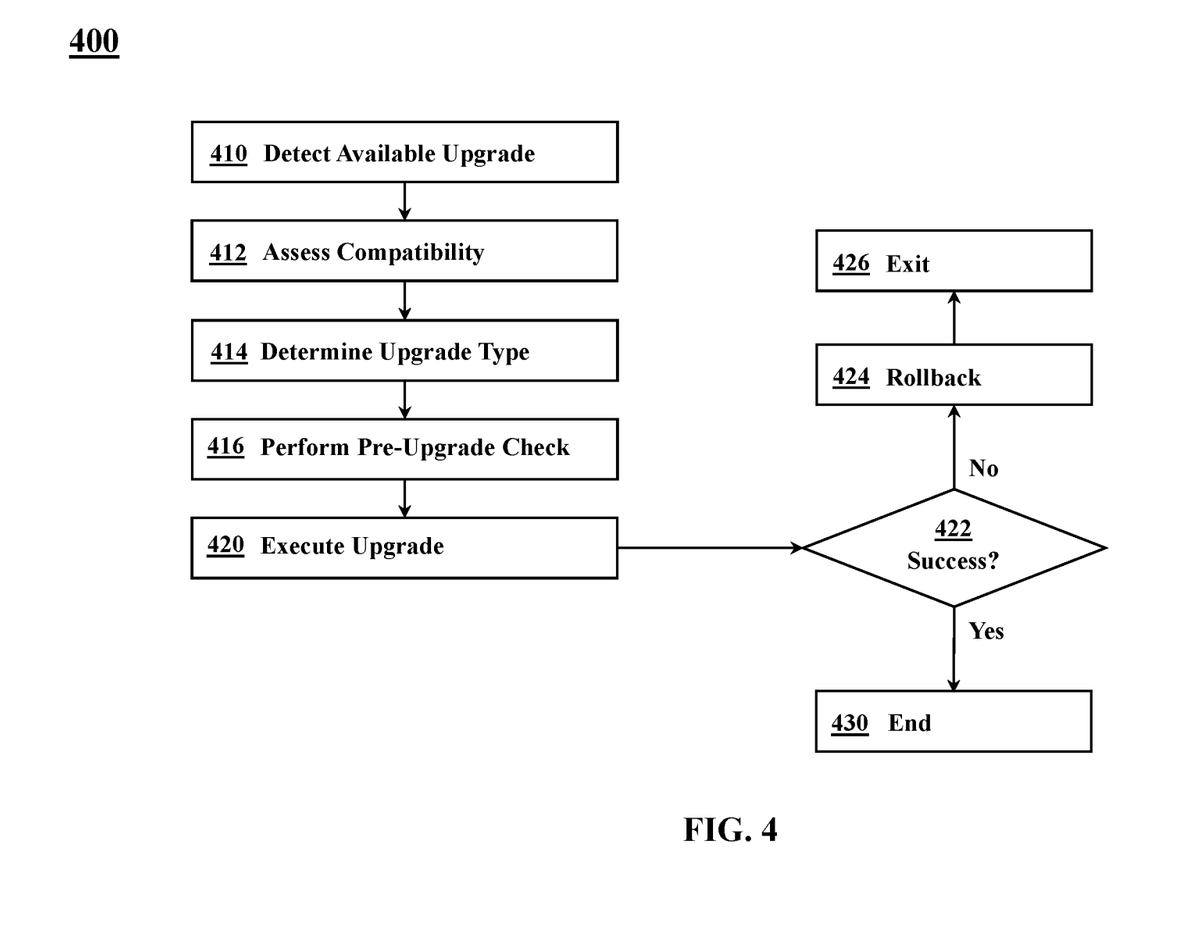
FIG. 4 depicts an upgrade workflow in accordance with some embodiments of the present disclosure.

FIG. 4 depicts an upgrade workflow 400 in accordance with some embodiments of the present disclosure. The upgrade workflow 400 may commence with detecting 410 an available upgrade and assessing 412 the compatibility of the upgrade with the system (e.g., the cluster system 100 shown in FIG. 1). The upgrade workflow 400 may include determining 414 the upgrade type (e.g., operator, code, or the like) and performing 416 one or more pre-upgrade checks to determine whether the upgrade is likely to be compatible with the system. The upgrade workflow 400 may continue by executing 420 the upgrade and deciding 422 whether the upgrade was successful. If the upgrade was successful, the upgrade workflow 400 may end 430. If the upgrade was unsuccessful, the process may continue by rolling back 424 the upgrade and exiting 426 the upgrade workflow 400.

The present disclosure may be implemented via various methods. A method in accordance with the present disclosure may include introducing, by a user, an extension module to a cluster and manifesting the configuration in the cluster. The extension module may include a user resource definition and a catalog server. The catalog server may maintain a configuration of the cluster.

In some embodiments of the present disclosure, a method may further include utilizing a register function and connecting a device external to the cluster in communication with the cluster via a protocol. The register function may be from the protocol.

In some embodiments of the present disclosure, the cluster may be a Kubernetes® cluster.

In some embodiments of the present disclosure, a method may further include introducing an external driver. The catalog server may maintain compatible versions between the cluster and the external driver based on a configuration of the external driver.

In some embodiments of the present disclosure, a method may further include communicating the catalog server with a repository. Some embodiments may also include managing a driver with the repository.

In some embodiments of the present disclosure, a method may further include updating the configuration and a driver to maintain interoperability between the configuration and the driver.

Figure 5:
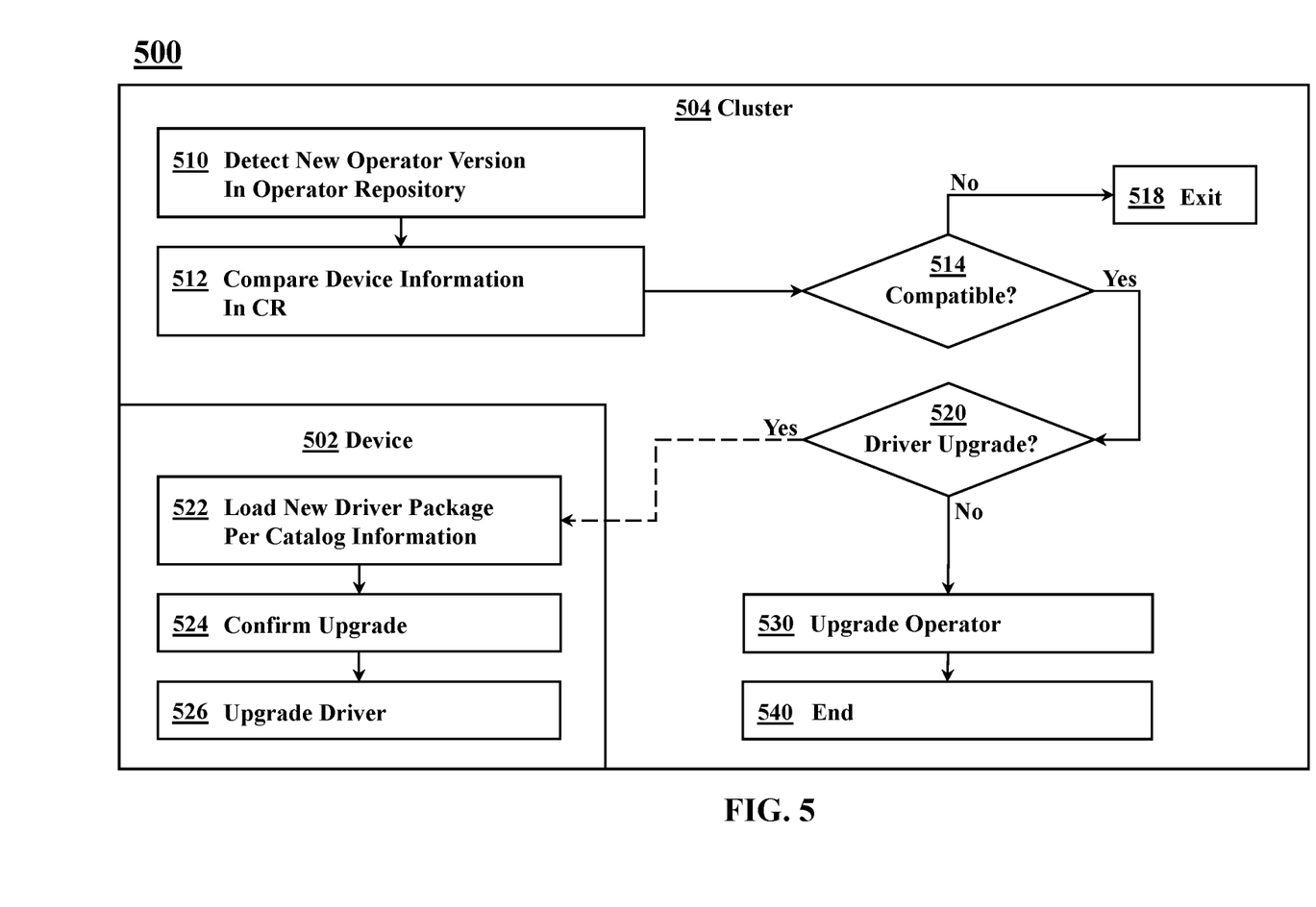
FIG. 5 illustrates an operator upgrade workflow in accordance with some embodiments of the present disclosure.

FIG. 5 illustrates an operator upgrade workflow 500 in accordance with some embodiments of the present disclosure. The operator upgrade workflow 500 may start in the cluster 502 by detecting 510 a new operator version in the official repository (e.g., an official OperatorHub) and comparing 512 the device 502 information in the CR to the new operator version. The operator upgrade workflow 500 process may continue by determining 514 whether the device 502 is compatible with the new operator version. If the new operator version is determined to not be compatible with the device 502, the operator upgrade workflow 500 concludes by exiting 518 the process without implementing an upgrade.

If the new operator version is determined to be compatible with the device 502, the operator upgrade workflow 500 may continue by identifying 520 whether the new operator version includes a driver upgrade for the device 502. If the new operator version does not include a driver upgrade for the device 502, then the operator upgrade workflow 500 continues by upgrading the operator 530 of the cluster 504 and ending 540 the process.

If the new operator version includes a driver upgrade for the device 502, then the operator upgrade workflow 500 may also include loading 522 a new driver package according to the catalog information, confirming 524 the driver upgrade, and upgrading the driver 526 of the device 502.

Figure 6:
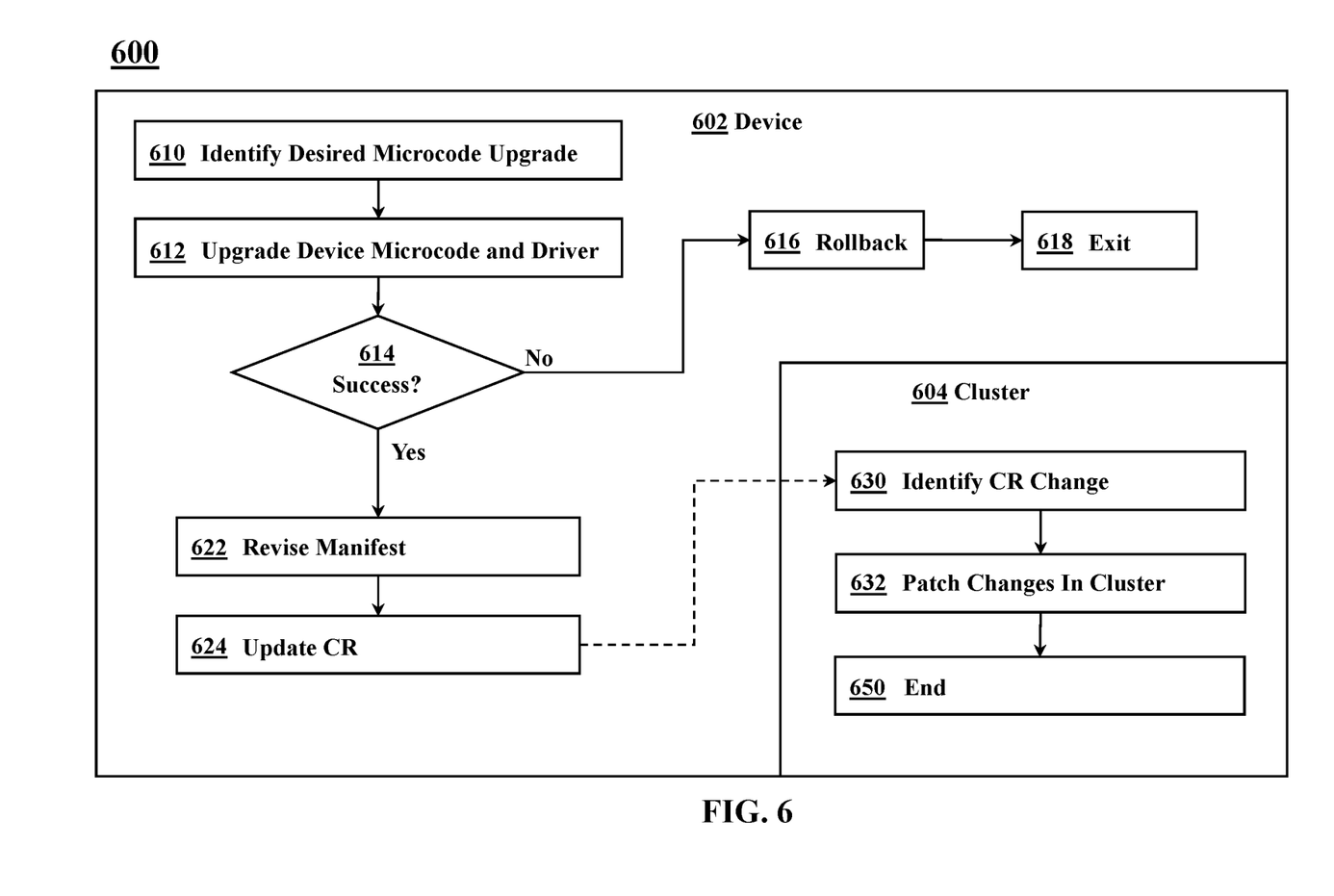
FIG. 6 depicts a device microcode upgrade workflow in accordance with some embodiments of the present disclosure.

FIG. 6 depicts a device microcode upgrade workflow 600 in accordance with some embodiments of the present disclosure. The device microcode upgrade workflow 600 may commence in a device 602 by identifying 612 a desired microcode upgrade. A desired microcode upgrade might include, for example, a hotfix, a coldfix, a bugfix, or a patch.

Upon identifying 612 a desired upgrade, the device microcode upgrade workflow 600 may continue by upgrading 612 the device microcode and driver and deciding 614 whether the upgrade was a success. If the upgrade was unsuccessful, the process may continue by rolling back 616 the upgrade and exiting 618 the device microcode upgrade workflow 600. If the upgrade was successful, the device microcode upgrade workflow 600 may continue by revising 622 the manifest to reflect the new specifications and updating 624 the CR.

The cluster 604 may be monitoring the CR of the device 602. Upon identifying 630 a change in the device (e.g., a change that may result from updating 624 the CR), the cluster 604 may continue the device microcode upgrade workflow 600 by patching 632 the changes in the cluster 604 and ending 650 the process.

Figure 7:
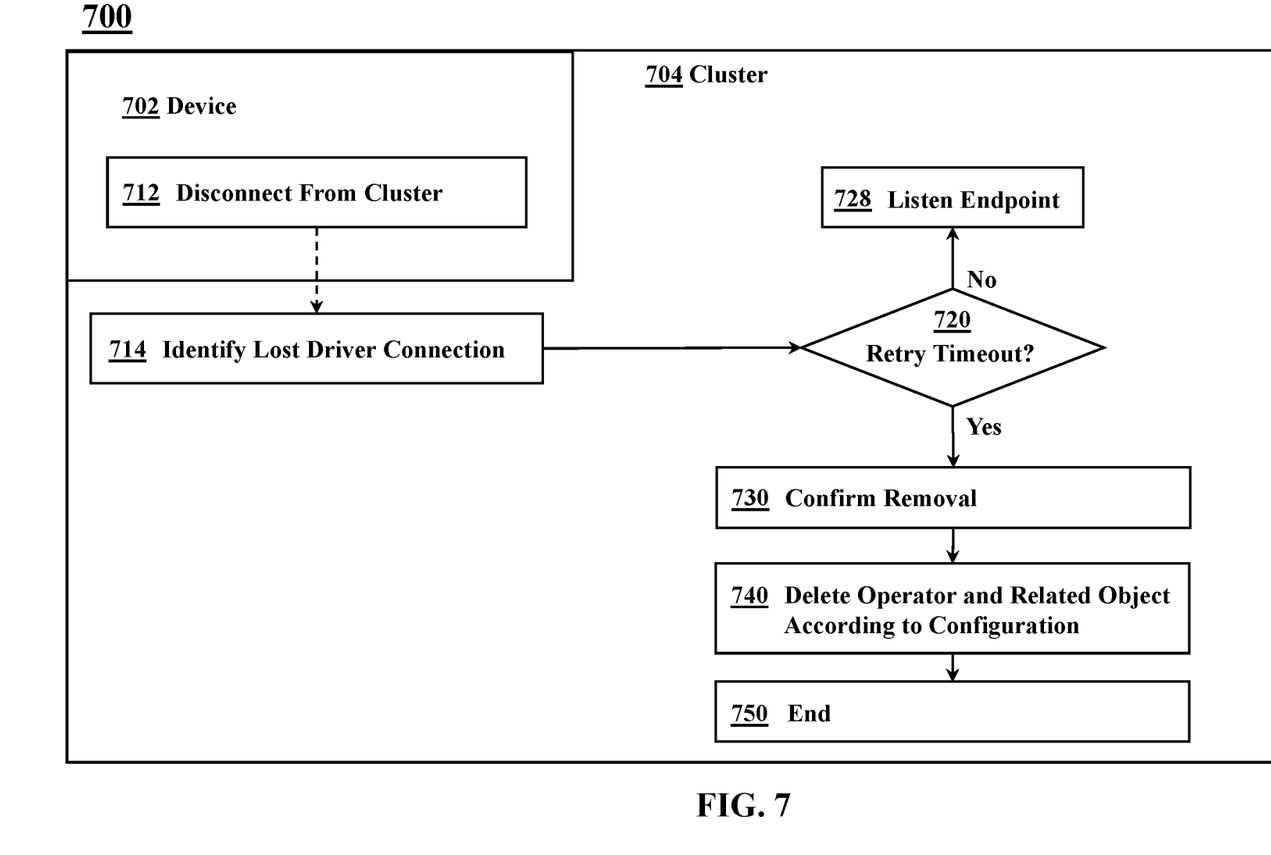
FIG. 7 illustrates a device removal workflow in accordance with some embodiments of the present disclosure.

FIG. 7 illustrates a device removal workflow 700 in accordance with some embodiments of the present disclosure. The process may start with a device 702 disconnecting 712 from the cluster 704. The cluster 704 proceeds by identifying 714 that the driver connection has been lost and deciding 720 whether or not to retry the timeout.

The device removal workflow 700 may continue by confirming 730 the removal of the device 702. In some embodiments, users may confirm the removal of the device 702. The process may also include deleting 740 the operator and related object according to the configuration and ending 750 the device removal workflow 700.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
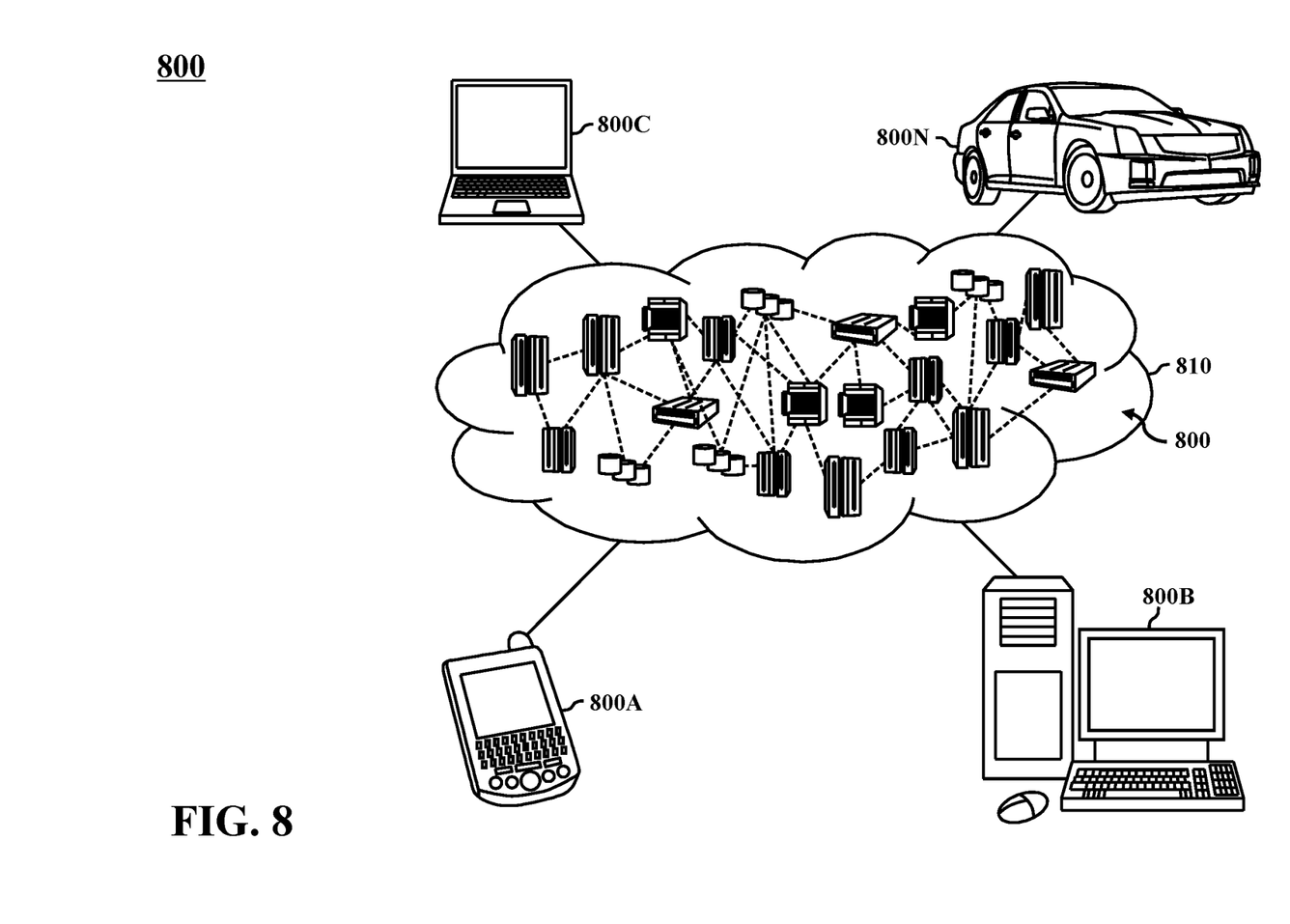
FIG. 8 depicts a cloud computing environment, in accordance with embodiments of the present disclosure.

FIG. 8 illustrates a cloud computing environment 810 in accordance with embodiments of the present disclosure. As shown, cloud computing environment 810 includes one or more cloud computing nodes 800 with which local computing devices used by cloud consumers such as, for example, personal digital assistant (PDA) or cellular telephone 800A, desktop computer 800B, laptop computer 800C, and/or automobile computer system 800N may communicate. Nodes 800 may communicate with one another. They may be grouped (not shown) physically or virtually, in one or more networks, such as private, community, public, or hybrid clouds as described hereinabove, or a combination thereof.

This allows cloud computing environment 810 to offer infrastructure, platforms, and/or software as services for which a cloud consumer does not need to maintain resources on a local computing device. It is understood that the types of computing devices 800A-N shown in FIG. 8 are intended to be illustrative only and that computing nodes 800 and cloud computing environment 810 can communicate with any type of computerized device over any type of network and/or network addressable connection (e.g., using a web browser).

Figure 9:
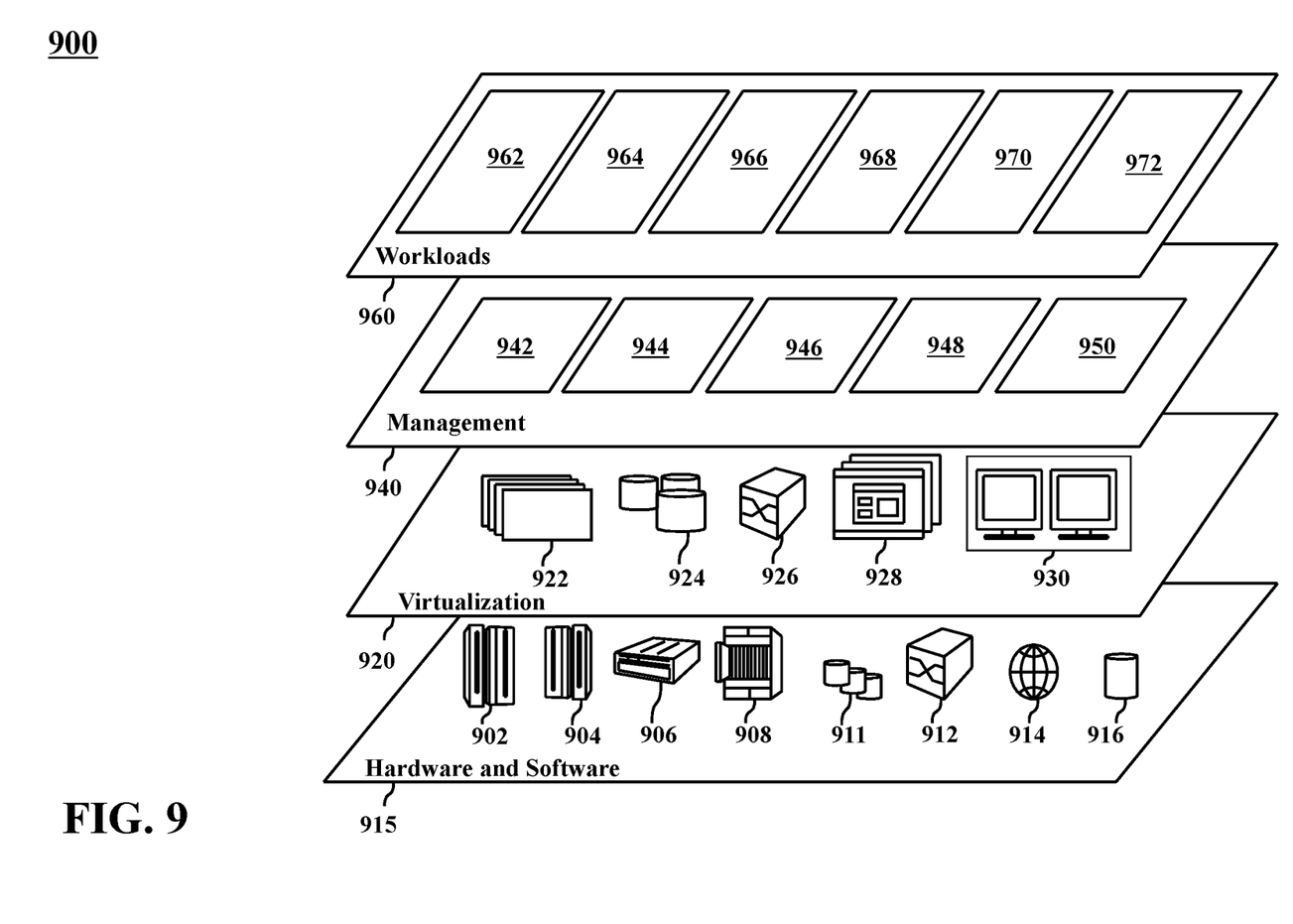
FIG. 9 depicts abstraction model layers, in accordance with embodiments of the present disclosure.

FIG. 9 illustrates abstraction model layers 900 provided by cloud computing environment 810 (FIG. 8) in accordance with embodiments of the present disclosure. It should be understood in advance that the components, layers, and functions shown in FIG. 9 are intended to be illustrative only and embodiments of the disclosure are not limited thereto. As depicted below, the following layers and corresponding functions are provided.

Hardware and software layer 915 includes hardware and software components. Examples of hardware components include: mainframes 902; RISC (Reduced Instruction Set Computer) architecture-based servers 904; servers 906; blade servers 908; storage devices 911; and networks and networking components 912. In some embodiments, software components include software 914 and an open-source container cluster hot plug adapter 916.

Virtualization layer 920 provides an abstraction layer from which the following examples of virtual entities may be provided: virtual servers 922; virtual storage 924; virtual networks 926, including virtual private networks; virtual applications and operating systems 928; and virtual clients 930.

In one example, management layer 940 may provide the functions described below. Resource provisioning 942 provides dynamic procurement of computing resources and other resources that are utilized to perform tasks within the cloud computing environment. Metering and pricing 944 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 946 provides access to the cloud computing environment for consumers and system administrators. Service level management 948 provides cloud computing resource allocation and management such that required service levels are met. Service level agreement (SLA) planning and fulfillment 950 provide pre-arrangement for, and procurement of, cloud computing resources for which a future requirement is anticipated in accordance with an SLA.

Workloads layer 960 provides examples of functionality for which the cloud computing environment may be utilized. Examples of workloads and functions which may be provided from this layer include: mapping and navigation 962; software development and lifecycle management 964; virtual classroom education delivery 966; data analytics processing 968; transaction processing 970; and artificial content identification 972.

Figure 10:
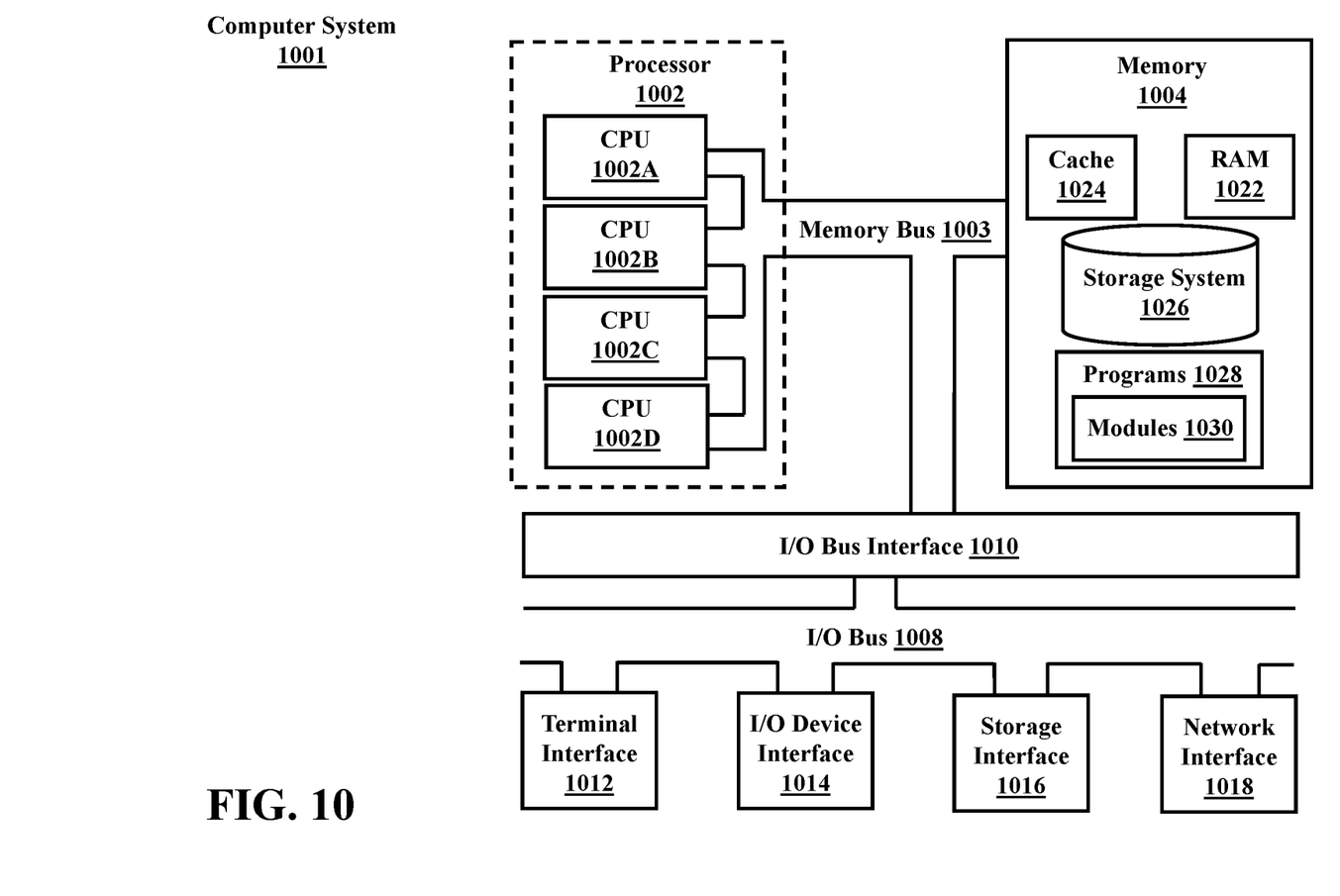
FIG. 10 illustrates a high-level block diagram of an example computer system that may be used in implementing one or more of the methods, tools, and modules, and any related functions, described herein, in accordance with embodiments of the present disclosure.

FIG. 10 illustrates a high-level block diagram of an example computer system 1001 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 1001 may comprise a processor 1002 with one or more central processing units (CPUs) 1002A, 1002B, 1002C, and 1002D, a memory subsystem 1004, a terminal interface 1012, a storage interface 1016, an I/O (Input/Output) device interface 1014, and a network interface 1018, all of which may be communicatively coupled, directly or indirectly, for inter-component communication via a memory bus 1003, an I/O bus 1008, and an I/O bus interface unit 1010.

The computer system 1001 may contain one or more general-purpose programmable CPUs 1002A, 1002B, 1002C, and 1002D, herein generically referred to as the CPU 1002. In some embodiments, the computer system 1001 may contain multiple processors typical of a relatively large system; however, in other embodiments, the computer system 1001 may alternatively be a single CPU system. Each CPU 1002 may execute instructions stored in the memory subsystem 1004 and may include one or more levels of on-board cache.

System memory 1004 may include computer system readable media in the form of volatile memory, such as random access memory (RAM) 1022 or cache memory 1024. Computer system 1001 may further include other removable/non-removable, volatile/non-volatile computer system storage media. By way of example only, storage system 1026 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 1004 can include flash memory, e.g., a flash memory stick drive or a flash drive. Memory devices can be connected to memory bus 1003 by one or more data media interfaces. The memory 1004 may include at least one program product having a set (e.g., at least one) of program modules that are configured to carry out the functions of various embodiments.

One or more programs/utilities 1028, each having at least one set of program modules 1030, may be stored in memory 1004. The programs/utilities 1028 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 1028 and/or program modules 1030 generally perform the functions or methodologies of various embodiments.

Although the memory bus 1003 is shown in FIG. 10 as a single bus structure providing a direct communication path among the CPUs 1002, the memory subsystem 1004, and the I/O bus interface 1010, the memory bus 1003 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 1010 and the I/O bus 1008 are shown as single respective units, the computer system 1001 may, in some embodiments, contain multiple I/O bus interface units 1010, multiple I/O buses 1008, or both. Further, while multiple I/O interface units 1010 are shown, which separate the I/O bus 1008 from various communications paths running to the various I/O devices, in other embodiments some or all of the I/O devices may be connected directly to one or more system I/O buses 1008.

In some embodiments, the computer system 1001 may be a multi-user mainframe computer system, a single-user system, a server computer, or similar device that has little or no direct user interface but receives requests from other computer systems (clients). Further, in some embodiments, the computer system 1001 may be implemented as a desktop computer, portable computer, laptop or notebook computer, tablet computer, pocket computer, telephone, smartphone, network switches or routers, or any other appropriate type of electronic device.

It is noted that FIG. 10 is intended to depict the representative major components of an exemplary computer system 1001. In some embodiments, however, individual components may have greater or lesser complexity than as represented in FIG. 10, components other than or in addition to those shown in FIG. 10 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a cluster in communication with an external device, wherein said external device is external to said cluster; and
a module of said cluster, and wherein said module comprises:
a user resource definition; and
a catalog server;
wherein said catalog server maintains compatibility between said cluster and said external device via maintaining a configuration of said cluster.

2. The system of claim 1, further comprising:
a protocol using a register process; and
a device external to said cluster in communication with said cluster via said protocol.

3. The system of claim 1, wherein:
said cluster is a Kubernetes cluster.

4. The system of claim 1, wherein:
said catalog server maintains compatible versions between said cluster and an external driver.

5. The system of claim 1, further comprising:
a repository in communication with said catalog server, wherein said repository maintains version information of a component of an external device.

6. The system of claim 5, wherein:
said repository manages said component of said external device.

7. The system of claim 1, wherein:
said catalog server updates said configuration and a driver to maintain interoperability between said configuration and said driver.

8. A method, said method comprising:
introducing, by a user, an extension module to a cluster in communication with an external device, wherein said external device is external to said cluster, and wherein said extension module includes:
a user resource definition; and
a catalog server;
manifesting a configuration in said cluster; and
maintaining compatibility between said cluster and said external device via said catalog server maintaining said configuration.

9. The method of claim 8, further comprising:
utilizing a register function, wherein said register function is from a protocol; and
connecting a device external to said cluster in communication with said cluster via said protocol.

10. The method of claim 8, wherein:
said cluster is a Kubernetes cluster.

11. The method of claim 8, wherein:
said catalog server maintains compatible versions between said cluster and an external driver.

12. The method of claim 8, further comprising:
communicating said catalog server with a repository.

13. The method of claim 12, further comprising:
managing a driver with said repository.

14. The method of claim 8, further comprising:
updating said configuration and a driver to maintain interoperability between said configuration and said driver.

15. A computer program product, said computer program product comprising a computer readable storage medium having program instructions embodied therewith, said program instructions executable by a processor to cause said processor to perform a function, said function comprising:

introducing, by a user, an extension module to a cluster in communication with an external device, wherein said external device is external to said cluster, and wherein said extension module includes:
a user resource definition; and
a catalog server; and
manifesting a configuration in said cluster; and
maintaining compatibility between said cluster and said external device via said catalog server maintaining said configuration.

16. The computer program product of claim 15, further comprising:
utilizing a register function, wherein said register function is from a protocol; and
connecting a device external to said cluster in communication with said cluster via said protocol.

17. The computer program product of claim 15, wherein:
said cluster is a Kubernetes cluster.

18. The computer program product of claim 15, wherein:
said catalog server maintains compatible versions between said cluster and an external driver.

19. The computer program product of claim 15, further comprising:
communicating said catalog server with a repository.

20. The computer program product of claim 15, further comprising:
updating said configuration and a driver to maintain interoperability between said configuration and said driver.

* * * * *